United States Patent [19]
Barton

[11] Patent Number: 5,927,340
[45] Date of Patent: Jul. 27, 1999

[54] ACCESS PLUS WITH SEALING FOR HIGH TEMPERATURE EQUIPMENT

[75] Inventor: David D. Barton, Houston, Tex.

[73] Assignee: Barton Resources Limited, Bellaire, Tex.

[21] Appl. No.: 09/075,138

[22] Filed: May 8, 1998

[51] Int. Cl.⁶ .................................................. F16L 55/10
[52] U.S. Cl. ............................. 138/92; 138/94; 215/355
[58] Field of Search .................................. 138/92, 90, 94, 138/89, 149, 148; 215/355; 220/789

[56] References Cited

U.S. PATENT DOCUMENTS

| | | | |
|---|---|---|---|
| 3,827,462 | 8/1974 | Celesta | 138/90 |
| 4,091,842 | 5/1978 | Greenawalt et al. | 138/90 |
| 4,290,536 | 9/1981 | Morel | 220/789 |
| 5,010,926 | 4/1991 | Kurth et al. | 138/92 X |
| 5,014,866 | 5/1991 | Moore | 138/89 X |
| 5,351,718 | 10/1994 | Barton | 138/92 |
| 5,520,220 | 5/1996 | Barton | 138/92 |

*Primary Examiner*—Patrick Brinson
*Attorney, Agent, or Firm*—Bracewell & Patterson L.L.P.

[57] ABSTRACT

An access plug flange is provided for inspection ports, for example on high temperature chemical processing vessels or pipes. The plug flange prevents heat loss through an access port formed in an insulative lining covering the vessel or pipe. The plug flange further does not deteriorate or lose its sealing effect despite its location near relatively high temperatures.

29 Claims, 5 Drawing Sheets

ACCESS PLUS WITH SEALING FOR HIGH TEMPERATURE EQUIPMENT

BACKGROUND OF THE INVENTION

1. Field of the Invention

The present invention relates to access plugs for sealing inspection ports or insulated vessels or pipes in chemical processing facilities and the like.

2. Description of the Related Art

Chemical processing equipment containers or walls conventionally have been enclosed within an insulative covering of foam or similar material. Periodically, it has been required to monitor or test the container walls or equipment for safety or environmental reasons. Access ports or passages have thus been formed in the insulative covering so that test instrumentation could gain access to the wall.

U.S. Pat. No. 5,351,718, of which applicant is inventor, provides an access plug flange assembly suitable for being fitted into an insulative covering on chemical processing equipment. Access plug flanges of this type have proven suitable for a considerable number of situations for chemical processing equipment insulative coverings.

U.S. Pat. No. 5,520,220, of which applicant is also inventor, provides an access mounting flange assembly suited for insulation coverings on cold temperature chemical process equipment. These types of access mounting flanges have addressed problems encountered with relatively cold chemical processing applications, such as protecting the integrity of a vapor barrier in the equipment insulation.

So far as is known, however, when the processing equipment was at high temperatures (typically at about 450° F. or higher) or when superheated steam was in the containers or vessels, additional problems have been encountered.

At temperature levels in this range, the silicone rubber in the sealing plugs or other components experienced problems. Oils present in the silicone elastomer materials leached out due to the high temperatures, causing the silicone seal to shrink and harden. This has caused the seal to lose its sealing ability, and in some cases fall out of its mounting. One proposal to remedy this problem was to add additional loose insulative padding. However, this loose insulation was often discarded or lost by the service crews when inspection service checks were performed. Also, some plug designs with metal caps and elastomer rings became difficult to remove due to both expansion of the metal cap and contraction of the rubber ring. In other designs, when adequate force was exerted to remove the plug, portions of the assembly, such as the metal expansion collar would also come out. This caused damage, often destroying the weather sealing effect.

So far as is known, the prior inspection port seals have been able to withstand only those temperatures that the silicone rubber components were capable of withstanding. The metal components of the flange had different thermal coefficients of expansion from those of the resilient materials in other parts of the flange provided to function as weather-tight seals. This has given rise to possible spaces or gaps in the seals, defeating their intended purpose.

SUMMARY OF THE INVENTION

Briefly, the present invention provides a new and improved access plug and sealing assembly for sealing an inspection port in insulative covering on high temperature process equipment. The flange assembly includes a collar for fitting in and through an outer portion of the insulative covering and defining the inspection port through the insulation and covering to a wall on the equipment for testing or inspection purposes.

A flange member that is insertable into the collar is also a part of the flange assembly. The flange member is insertable into the collar, having an outer mounting rim for mounting with the insulative covering. When the process equipment is operating at sufficiently high temperatures a ceramic saddle is provided in the inspection port and mounted on the equipment wall below the collar. The flange member has a sleeve which extends from the mounting rim into the inspection port and an inwardly extending lower lip which is formed on the sleeve opposite the mounting rim.

A sealing cup of the mounting flange assembly is insertable into the flange member to seal the inspection port. The sealing cup has a lower wall to extend across and close the inspection port and a side wall extending upwardly from a juncture with the lower wall. A connector is formed at an upper end of the side wall for engaging the mounting rim of the flange member. With the present invention, the juncture formed in the sealing cup between the lower wall and side wall defines a surface conforming to and serving as an extension of the flange member lip, forming a metal-to-metal, radiant barrier mechanical seal to seal the inspection port.

The mechanical seal so formed by the flange assembly of the present invention thus serves as an inner or first seal. The sealing cup of the flange assembly may also be formed to receive a second or external seal. This second seal includes a sealing elastomer which is located externally of the insulative covering, between the sealing cup and the flange assembly. The sealing elastomer is thus at a general ambient temperature level, and thus is protected from high temperature conditions which would otherwise cause the elastomer to shrink and harden. Sealing structure is also provided between the flange member mounting rim and the insulative covering.

DETAILED DESCRIPTION OF THE PREFERRED EMBODIMENT

Figure 1:
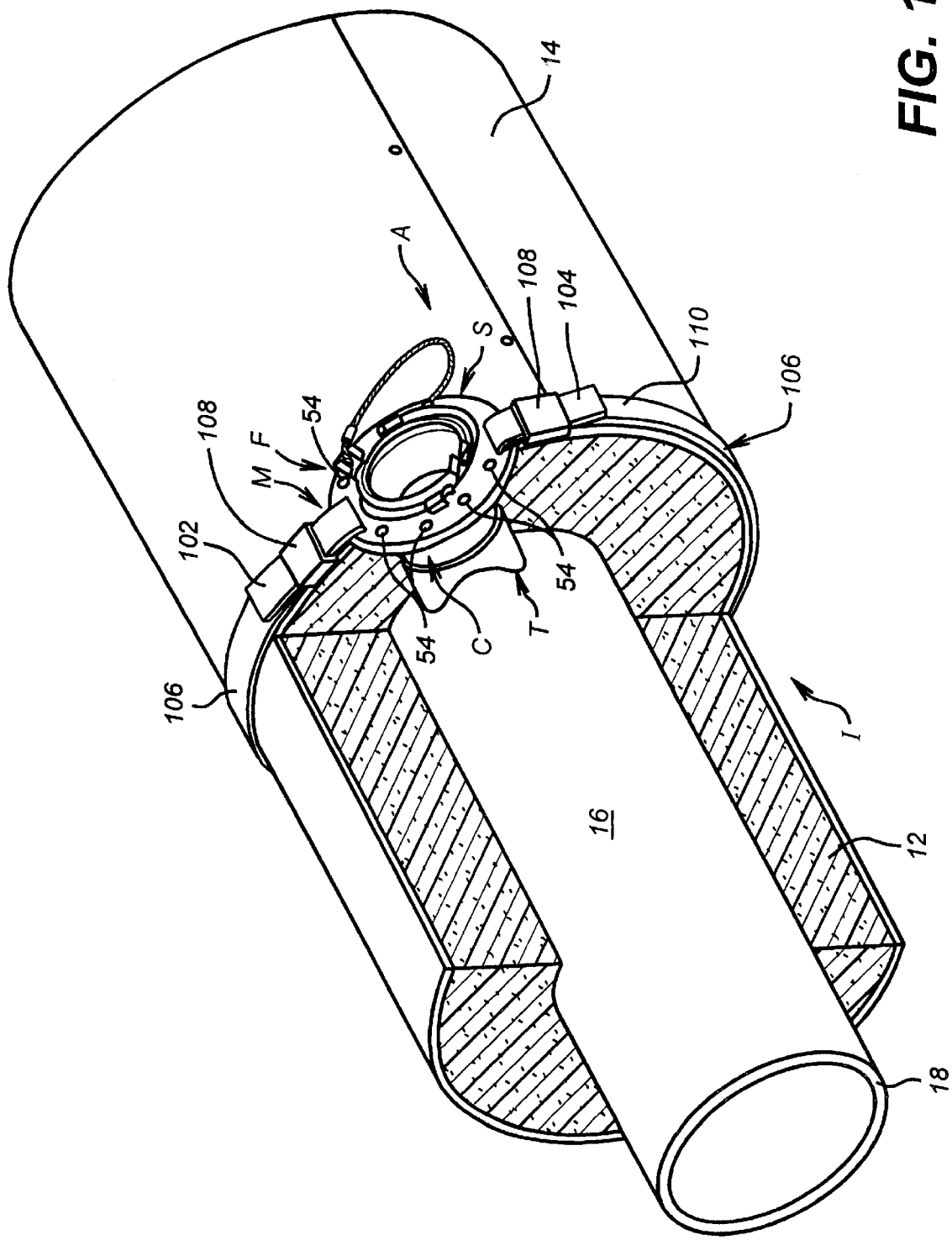
FIG. 1 is an isometric view, taken partly in cross-section, of an access mounting flange assembly for chemical processing equipment according to the present invention.

In the drawings, the letter A designates generally an access mounting flange assembly for sealing a port P in an insulative covering I, generally an insulative material 12 located within an outer metal jacket or covering 14. The insulative material 12 is applied over an outer surface 16 of a wall 18 of a conventional item of chemical processing equipment E, such as a vessel tube or the like. The jacket 14 may be wrapped or otherwise suitably applied over the insulative material 12. As used in the present invention, the term equipment is used to refer to vessels, containers or other types of equipment used in chemical processing systems, as well as pipes, tubing or conduits connecting such equipment.

The flange assembly A of the present invention is particularly adapted for use with high temperature equipment. However, the flange assembly A may also be used with other process equipment, as well. As used in the present invention, high temperature equipment refers to operating temperatures and processing equipment at which the oils in silicone rubber used in seals in prior flange assemblies began to leach out and cause the silicone rubber to exhibit undesirable properties. Typically, this occurs at temperature ranges beginning at about 450° F. or so. The particular temperature, however, may vary depending on the type of equipment. With superheated steam, for example, higher temperatures are present.

The port P is generally a cylindrical opening or passage 20, precut or otherwise formed extending inwardly from a circular hole 22 cut in the jacket or cover 14. The hole 22 extends through a cylindrical side wall 24 in the insulative material 12 to an external surface 26 of the vessel wall 16. When the port P is open through the assembly A, access for inspection or test probes or other test equipment to the surface 26 may be provided.

The access mounting flange assembly A according to the present invention includes a collar C which fits in an outer portion 30 of the inspection port P in the insulative covering I. When the equipment is operating at high temperatures and material separation is desired, a tubular ceramic saddle T is provided. The saddle T is mounted on the wall 16 of the equipment in the inspection port P beneath the collar C to receive the collar C within the insulative material 12. The collar C and the ceramic saddle T thus define an access passage 32 through the jacket 14 and insulative covering 12 to the equipment wall 18 for testing purposes.

A flange F is insertable into the collar C to serve as a receiving member for a sealing cup S. The sealing cup S is insertable in the flange F in a manner to be set forth for sealing the flange F and consequently the access passage 30. The flange F is mounted on the insulative covering 12 at an external surface 34 of the jacket 14 by means of an attachment or mounting mechanism M. The attachment mechanism M may be, for example, of the types described in applicant's prior U.S. Pat. No. 5,520,220, which is incorporated herein by reference.

Figure 3:
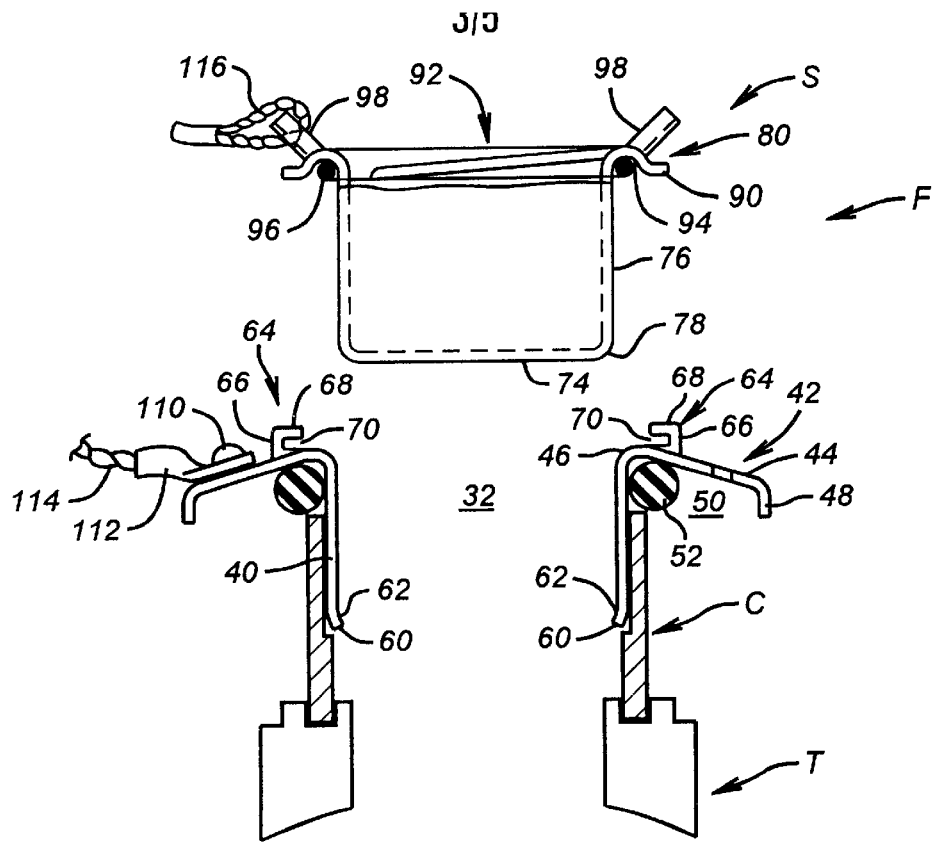
FIG. 3 is an elevation view, taken partly in cross-section, of the flange assembly of FIGS. 1 and 2.
Figure 4:
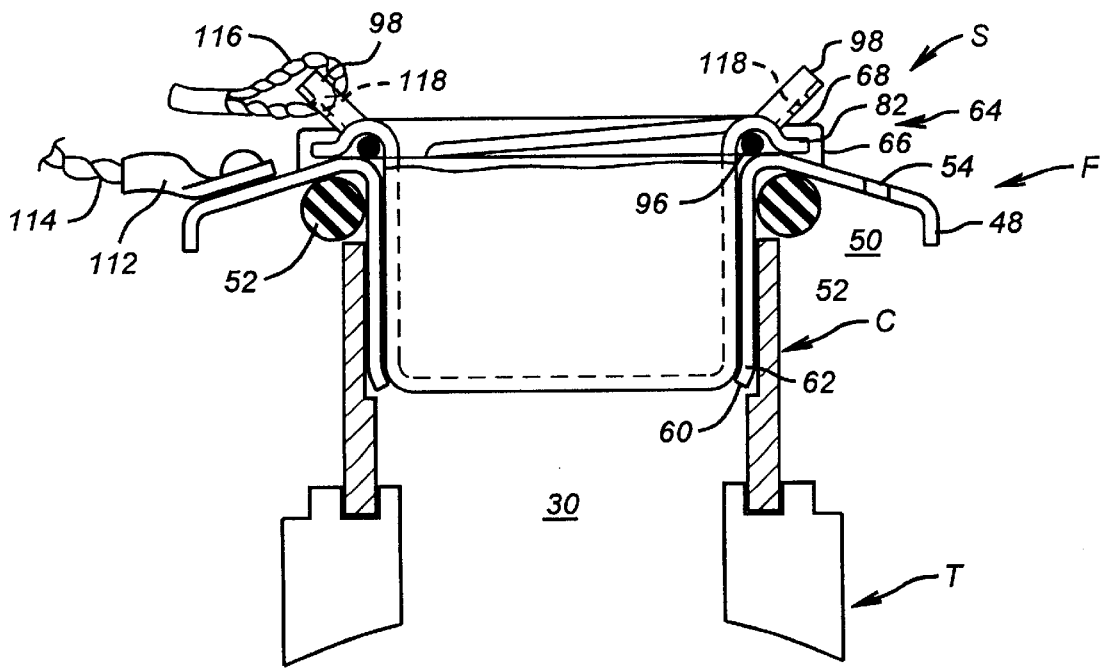
FIG. 4 is another elevation view, taken partly in cross-section, of the flange assembly of FIGS. 1, 2 and 3.
Figure 6:
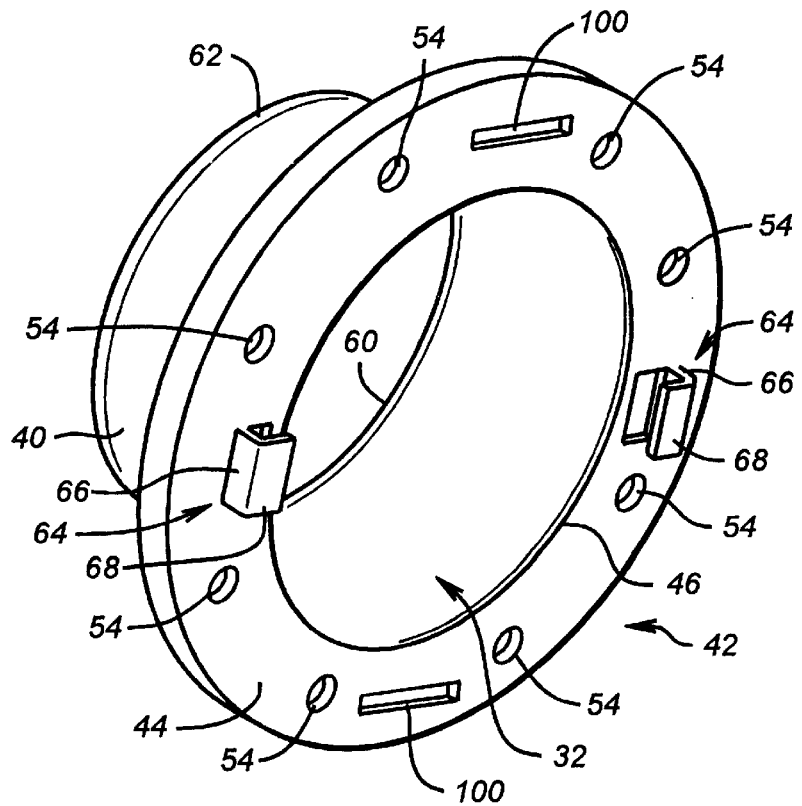

The flange member F is typically formed of a suitable strength metal and has a cylindrical sleeve or tube member 40 which extends inwardly from a mounting rim 42. The sleeve 40 is adapted to extend inwardly within the collar C, usually in a counterbored, press-fit engagement with the collar C. The mounting rim 42 is formed as a circular plate or disk 44 (FIGS. 3, 4, and 6) extending outwardly from an upper end 46 of the sleeve 40 at the access passage 32. The mounting rim 42 extends outwardly to a downwardly extending edge or outer lip 48 which is adapted to rest on the cover 14, defining a sealant recess 50 (FIG. 4).

An O-ring 52 or other suitable seal is typically mounted within the recess 50 adjacent the upper end 46 of the sleeve 40. The seal 52 is adapted to engage and seal with the collar C outside of the access passage 32 and above the insulative covering I. It should be understood that in some instances, an O-ring seal might be needed. The sealant recess 50 is typically adapted to receive a silicone sealing elastomer, which may be injected or otherwise introduced as disclosed in applicant's prior U.S. Pat. No. 5,351,718, which is incorporated herein by reference for all purposes. A suitable number of connector openings or ports 54 are also typically formed in the plate 44 so that fastener or attachment screws 56 or other connectors may be inserted, if desired, as also is described in applicant's U.S. Pat. No. 5,351,718. The ports 54 also serve as points for insertion for injection of sealing elastomer into the recess 50.

The sleeve 40 of the flange member F extends downwardly into the collar C a suitable distance, usually one inch or more to an inwardly extending lip 60 (FIG. 4) at a lower end 62. The lip 62 is an arcuate or curved member and forms one element of a first or internal inspection port seal. The first or inner seal is a radiant barrier mechanical seal as will be set forth.

Figure 2:
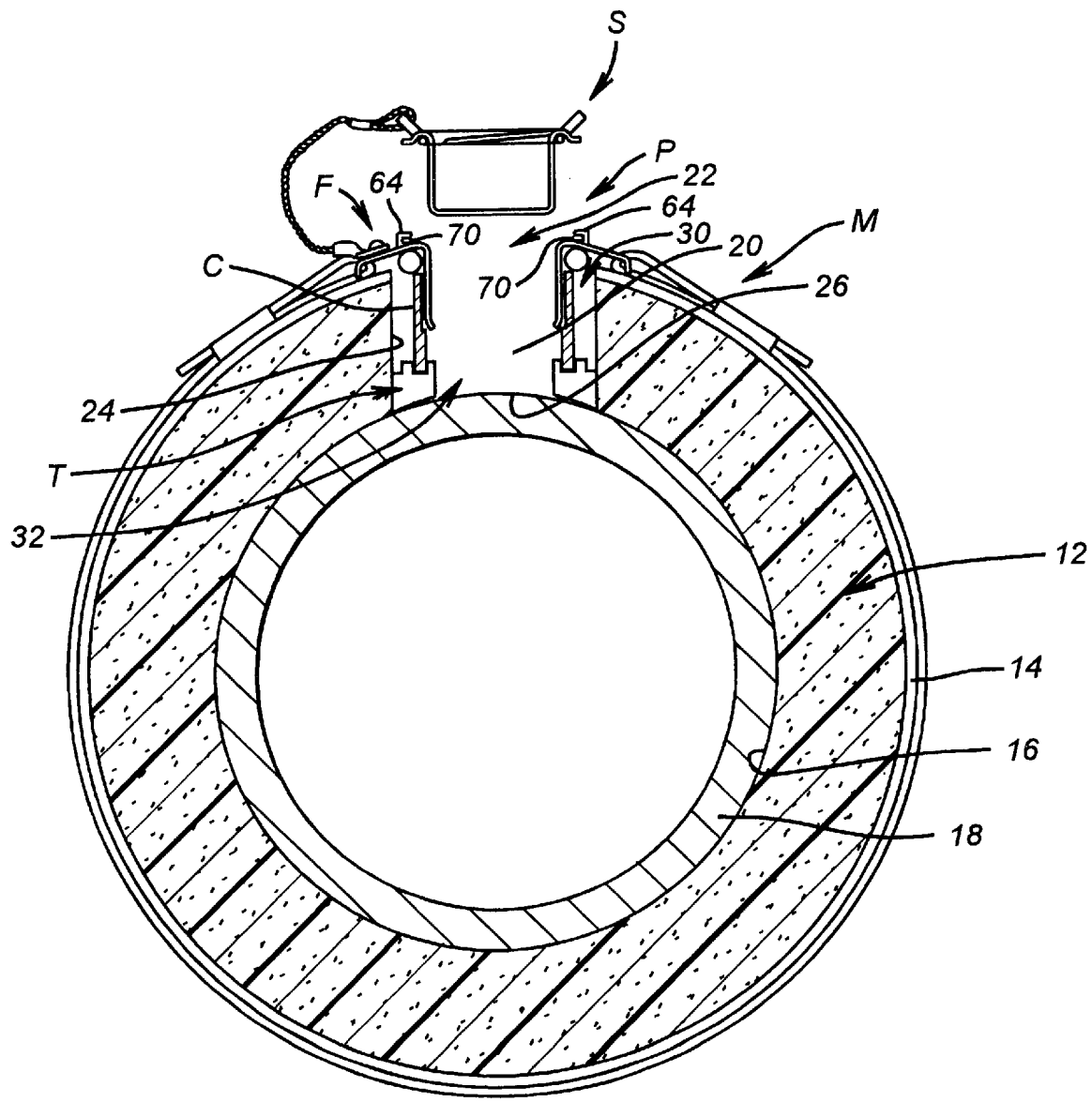
FIG. 2 is an elevation view, taken partly in cross-section, of the flange assembly of FIG. 1.
Figure 5:
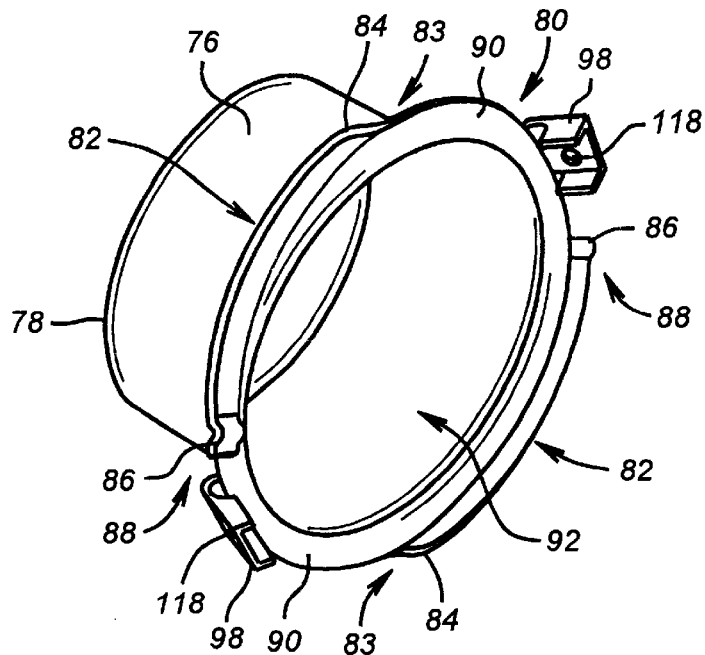
FIGS. 5 and 6 are isometric views of certain components of the flange assembly of FIGS. 1–4.

The flange member F further has a set of at least two upwardly extending contact lug members 64 (FIGS. 2, 3, and 5) formed above the mounting rim 42. The attachment lugs 64 have an upright portion 66 and an inwardly extending arm portion 68, defining a connector opening or space 70 (FIGS. 2 and 3) for connection with portions of the sealing cup S, as will be set forth.

The sealing cup S is preferably formed of a like suitable strength metal to the flange member F and is insertable into the flange member F to seal the inspection port P. The sealing cup S has a transversely extending lower wall or base member 74 adapted to extend across and form a barrier against unwanted entry of liquid into the access opening 32 to protect the surface 24 of the equipment. The seal cup S also serves as a barrier to exit of radiant heat. The sealing cup S also has a cylindrical side wall 76 extending inwardly from a curved juncture 78 with the lower wall 74. The side wall 76 of the sealing cup S is adapted to fit within the sleeve 40 of the flange member F along its upward extent to a connector 80 which engages the attachment lugs 64 of the flange member F.

The connector 80 of the sealing cup S includes an outwardly extending lip 82 formed at an upper end of the side wall 80. The lip 82 of the connector 80 is preferably a partial helical spiral (FIG. 5) extending at each of two spaced start positions 83 helically upwardly from a lead or entry portion 84 to a raised stop 86 at an end portion 88. In this way, rotational movement of the sealing cup S and the connector 80 with respect to the flange member F causes downward compressive forces, which are exerted on the sealing components of the flange assembly A as the sealing cup S is inserted into and connected with the flange member F.

The start positions 83 of connector lip 82 on sealing cup S are preferably formed as an outer end portion of a circular disk 90 extending outwardly from the central opening or space 92 in the seal cup S. An annular downwardly extending groove 94 (FIG. 3) is formed in the disk 90 about the sealing cup connector 80 inwardly of the lip 82 to receive an O-ring 96 or other suitable seal. The seal 96 is adapted to form a seal against the mounting ring 42 adjacent the upper end 46 of the flange F to form an external vapor barrier or seal. A set of at least two suitably located contact lug members 98 are formed extending upwardly from the circular disk 90. The lug members 98 preferably extend outwardly at an inclined angle, typically 45° or so, from the vertical or horizontal planes of disk 90. It should be understood, however, that other angles such as vertical or horizontal might also be used. The lug members 98 provide contact or gripping areas for service crew members to engage the sealing cup S and apply force to rotate it for installation into the flange member F for sealing purposes.

The juncture 78 (FIG. 4) of the inner wall 74 and side wall 76 of the sealing cup S is a curved or arcuate transition, having its curvature selected to match that of the curvature of the arcuate lip 62 of the flange member F. In this manner, when the sealing cup S is inserted and rotated into compression on the flange member F, a corresponding metal-to-metal, radiant barrier seal is formed in the interior of the flange assembly A within the insulative covering C. Further, since both the cup S and the flange F are preferably of like metal materials, no detrimental heat build-up occurs such as would be present between a silicone rubber-to-metal seal.

It is also to be noted the vertical extent of the side wall 76 of sealing cup S is such that initial contact of juncture 78 and lip 60 of the inner seal occurs when disk 90 of sealing cup S is fitted into slot 70 of lug 64. As the sealing cup S is thereafter rotated, the helical lip 82 of connector 80 and the lug 64 cause a downward camming action, so that the juncture 78 and lip 60 move into firm mechanical sealing contact. Further, the O-ring 96 is also compressed by this camming action.

The collar plate 44 of the flange F has a pair a diametrically opposed passage slots 100 formed therein for receipt and passage of end portions 102 and 104 of attachment strap 106 of the attachment mechanism M. As set forth above, the attachment mechanism M may be formed according to applicant's prior U.S. Pat. No. 5,526,220. The end portions 102 and 104 of the attachment strap 106 are inserted upwardly through the passage slots 100. Thereafter, the end portions 102 and 104 are drawn away from the plate member 44 until the flange F is firmly in place on the jacket 14, thus putting the resilient saddle T in compression with the outer surface 26 of the equipment. Binder bands or tapes 108 are attached to hold the end portions 102 and 104 in position against intermediate portions 108 and 110, respectively of the belt 106.

Figure 7:
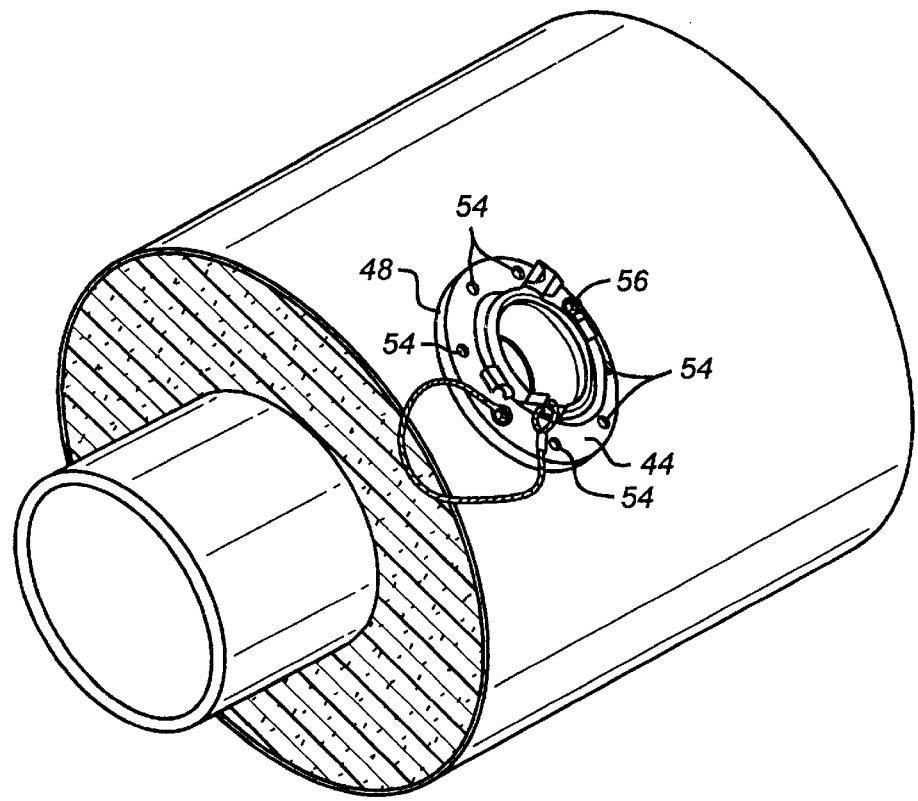
FIG. 7 is an isometric view, taken partly in cross-section, of an alternate access mounting flange assembly according to the present invention.

It should be understood that the plate member 44 may also have a suitable number of connector openings 54 as set forth above formed therein for receipt of connector or attachment screws 56 (FIG. 7) in addition to or in place of the belt 106. Also, the sealant material or elastomer injected or otherwise placed into the recess 50 for sealing purposes in the manner discussed above may also serve as an attachment mechanism to combine the plate member 44 to the insulative cover I for attachment purposes.

The plate 44 is also adapted to receive a connector stud or pin 110 (FIG. 3) at an end connection 112 of a connector line or cable 114 of suitable length. The connecting line or cable 114 is preferably of the type described in applicant's prior U.S. Pat. No. 5,351,718, which is incorporated by reference. The cable or line 114 is formed of a braided metal cable of suitable strength and moisture and corrosion resistant properties, such as a braided stainless steel. The connector line 114 has an eyelet 116 formed at an opposite end from its end connector 112. The eyelet 116 is connected through an opening 118 in either of the contact lug members 98 extending upwardly from the disk 90. In this manner, the connector cable 114 fixedly attaches the sealing cup S to the flange F. This protects against loss or misplacement of the sealing cup S when it is removed from the port P for inspection purposes.

The flange assembly F is installed on the insulative covering I by installing the tubular saddle T and collar C in the inspection port. The flange member F is then attached to the covering I with the attachment mechanism M, using either mechanical structure, or sealing elastomer, or both. The sealing cup S that is attached by the connector cable 114 to the flange F is then ready for installation to seal the hole 22 and access passage 32.

The start positions 83 of lips 82 on sealing cups S are fitted into spaces 70 of the attachment lugs 64. The sealing cup S is then rotated at lug members 98, causing compressive forces on the sealing components because of the helical structure of lip 82. Rotation of sealing cup S continues for approximately one-half turn, when stop members 86 contact arms 68 of lug members 64.

In this position, a metal-to-metal internal radiant barrier seal is formed between lip 62 of sleeve 40 and juncture surface 78 of sealing cup S. In addition, the seals or O-rings 52 and 96 are under compressive sealing forces externally of the insulative covering I, forming an outer weather seal at external ambient temperature conditions.

Figure 8:
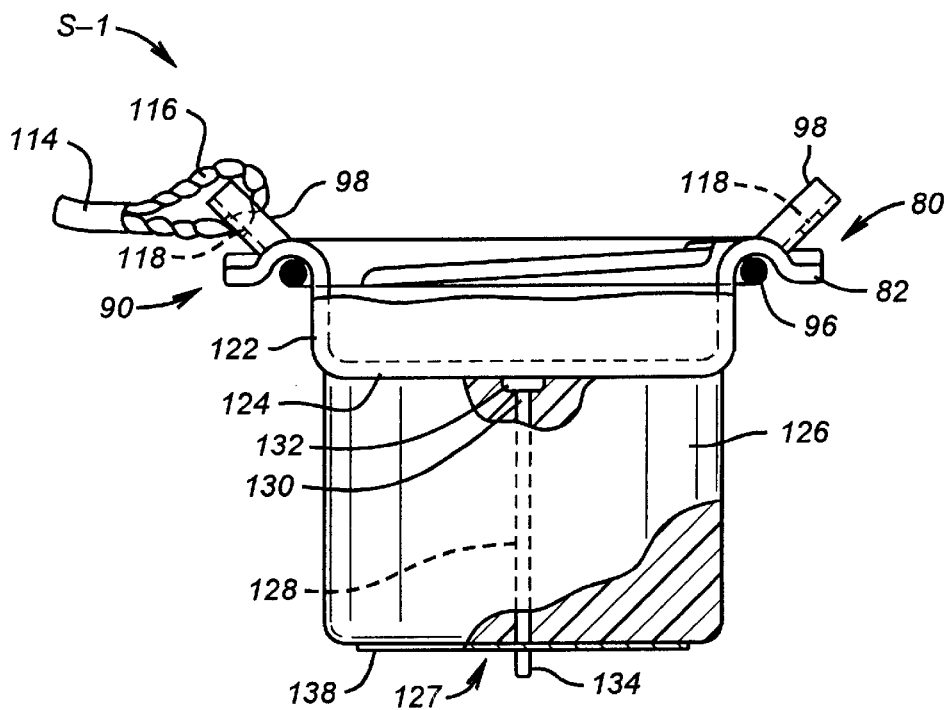
FIG. 8 is an elevation view, taken partly in cross-section, of an alternate sealing cup for the flange assembly of FIGS. 1–4 and 7.

For higher temperature conditions in processing equipment, an alternative sealing cup S-1 (FIG. 8) according to the present invention may be used. The sealing cup S-1 can, of course, also be used in any of the situations where the sealing cup S is used. Like structure in the sealing cup S-1 to that of the sealing cup S bears like reference numerals. In the sealing cup S-1, a cylindrical side wall 122 is of somewhat less depth in its inward extent below the disk 90 and seal 96. The sealing cup S-1 includes a lower wall member 124 extending in a like manner to wall 74 across access opening 32.

The sealing cup S-1 includes a generally cylindrical insulative pad 126 of one or more layers of conventional insulative material, such as refractory ceramic fiber. The type of insulative material used in pad 126 may be mineral wool or refractory fiber, depending on requisite insulating characteristics expected service temperature conditions. Expected service temperatures and insulation requirements also determine the thickness of insulative pad 126.

The insulative pad 126 is preferably mounted with sealing cup S-1 by a suitable attachment mechanism 127. In the preferred embodiment, the attachment mechanism 127 includes a connector pin or clip 128 of aluminum or other metal. The connector pin 128 is stud welded at an inner end 130 as indicated at 132 to the lower wall member 124. The connector pin 128 extends downwardly through the insulator pad 126. An outer end 134 of connector pin 128 extends below a lower surface 136 through a retaining washer or clip 138 of the attachment mechanism 127. The washer 138 may be, for example, a conventional square or round retainer washer of the stainless type sold by Southern Stud Weld Corporation. It should be understood that other forms of pins or fastener mechanism could also be used. Further, the pin 128 could be made an integral part of the sealing cup S-1, if desired.

Having described the invention above, various modifications of the techniques, procedures, material and equipment will be apparent to those in the art. It is intended that all such variations within the scope and spirit of the appended claims be embraced thereby.

I claim:

1. An access mounting flange assembly for sealing an inspection port in insulative covering on chemical process equipment, comprising:

a collar for fitting in an outer portion of the insulative covering;

said collar defining the inspection port through the insulative covering to a wall on the equipment for testing purposes;

a flange member insertable into said collar and having an outer mounting rim for mounting with said collar, said flange member including a sleeve extending from said mounting rim into the inspection port and an inwardly extending lower lip formed on said sleeve opposite said mounting rim;

a seal member mounted between said flange member mounting rim and said collar;

a sealing cup insertable into said flange member to seal the inspection port and having a lower wall to close the inspection port and a side wall extending upwardly from said lower wall; and a connector at an upper end of said side wall for engaging said mounting rim of said flange member.

2. The flange assembly of claim 1, wherein the chemical process equipment is high temperature equipment.

3. The flange assembly of claim 2, further including:

a tubular saddle for mounting on a wall of the equipment in the inspection port beneath said collar to receive said collar within the insulative covering.

4. The flange assembly of claim 1, wherein:

said flange member has a connector mechanism formed on said mounting rim.

5. The flange assembly of claim 4, wherein:

said flange member connector mechanism engages said sealing cup connector to hold said sealing cup in sealing engagement with said flange member.

6. The flange assembly of claim 1, wherein each of said flange member and said sealing cup are formed of metal.

7. The flange assembly of claim 1, wherein:

said sealing cup is rotatable on insertion in said flange member for said sealing cup connector to engage said flange member mounting rim.

8. The flange assembly of claim 7, wherein:

said flange member has a connector mechanism formed on said mounting rim.

9. The flange assembly of claim 8, wherein:

said flange member connector mechanism comprises receptor tabs formed on said mounting rim.

10. The flange assembly of claim 9, wherein said sealing cup connector comprises an outwardly extending lip formed at said upper end of said side wall.

11. The flange assembly of claim 10, wherein said receptor tabs engage said sealing cup connector lip.

12. The flange assembly of claim 10, further including:

a groove formed extending about said sealing cup connector inwardly of said lip; and a sealing member fitted in said groove for engaging said flange member to seal against said flange member.

13. The flange assembly of claim 7, further including:

at least one contact lug member extending upwardly from said sealing cup for receipt of rotational forces.

14. The flange assembly of claim 13 wherein said contact lug member extends outwardly from said sealing cup.

15. The flange assembly of claim 1, further including:

a groove formed in said sealing cup connector about a circumferential portion of said connector; and a sealing member fitted in said groove for engaging said flange member to seal against said flange member.

16. The flange assembly of claim 1, further including:

a connector cord attaching said sealing cup to said flange member.

17. The flange assembly of claim 1, wherein said side wall extends upwardly from a juncture with said lower wall, and further including:

said juncture between said sealing cup side wall and lower wall having a surface forming an extension of said flange member lower lip and forming a seal between them to seal the inspection port.

18. The flange assembly of claim 1 further including:

an insulative pad mounted with said lower wall of said sealing cup.

19. The flange assembly of claim 18, further including:

an attachment mechanism for attaching said insulative pad to said lower wall of said sealing cup.

20. The flange assembly of claim 19, wherein said attachment mechanism includes:

a retainer mounted below said insulative pad; and a connector for attaching said retainer to said sealing cup.

21. An access mounting flange assembly for sealing an inspection port in insulative covering on high temperature chemical process equipment, comprising:

a collar for fitting in an outer portion of the inspection port in the insulative covering;

a tubular saddle for mounting on a wall of the equipment in the inspection port beneath said collar to receive same within the insulative covering;

said collar and said tubular saddle defining the inspection port through the insulative covering to the equipment wall for testing purposes;

a flange member insertable into said collar and having an outer mounting rim for mounting with said collar, said flange member including a sleeve extending from said mounting rim into the inspection port and an inwardly extending lower lip formed on said sleeve opposite said mounting rim;

a seal member mounted between said flange member mounting rim and said collar;

a sealing cup insertable into said flange member to seal the inspection port and having a lower wall to close the inspection port, a side wall extending upwardly from said lower wall; and a connector at an upper end of said side wall for engaging said mounting rim of said flange member.

22. The flange assembly of claim 21, wherein said side wall extends upwardly from a juncture with said lower wall, and further including:

said juncture between said sealing cup side wall and lower wall having a surface forming an extension of said flange member lower lip and forming a seal between them to seal the inspection port.

23. The flange assembly of claim 21, further including:

an insulative pad mounted with said lower wall of said sealing cup.

24. The flange assembly of claim 23, further including:

an attachment mechanism for attaching said insulative pad to said lower wall of said sealing cup.

25. The flange assembly of claim 23, wherein said attachment mechanism includes:

a retainer mounted below said insulative pad; and a connector for attaching said retainer to said sealing cup.

26. An access mounting flange assembly for sealing an inspection port in insulative covering on chemical process equipment, comprising:

a collar for fitting in an outer portion of the insulative covering;

said collar defining the inspection port through the insulative covering to a wall on the equipment for testing purposes;

a flange member insertable into said collar and having an outer mounting rim for mounting with said collar, said flange member including a sleeve extending from said mounting rim into the inspection port and an inwardly extending lower lip formed on said sleeve opposite said mounting rim;

a sealing cup insertable into said flange member to seal the inspection port and having a lower wall to close the inspection port and a side wall extending upwardly from said lower wall;

a connector at an upper end of said side wall for engaging said mounting rim of said flange member;

a groove formed in said connector about a circumferential portion of said connector; and a sealing member fitted in said groove for engaging said flange member to seal against said flange member.

27. An access mounting flange assembly for sealing an inspection port in insulative covering on chemical process equipment, comprising:

a collar for fitting in an outer portion of the insulative covering;

said collar defining the inspection port through the insulative covering to a wall on the equipment for testing purposes;

a flange member insertable into said collar and having an outer mounting rim for mounting with said collar, said flange member including a sleeve extending from said mounting rim into the inspection port and an inwardly extending lower lip formed on said sleeve opposite said mounting rim;

a sealing cup insertable into said flange member to seal the inspection port and having a lower wall to close the inspection port and a side wall extending upwardly from said lower wall;

an insulative pad mounted with said lower wall of said sealing cup; and a connector at an upper end of said side wall for engaging said mounting rim of said flange member.

28. The flange assembly of claim 27, further including:

an attachment mechanism for attaching said insulative pad to said lower wall of said sealing cup.

29. The flange assembly of claim 28, wherein said attachment mechanism includes:

a retainer mounted below said insulative pad; and a connector for attaching said retainer to said sealing cup.

* * * * *

UNITED STATES PATENT AND TRADEMARK OFFICE
CERTIFICATE OF CORRECTION

PATENT NO. : 5,927,340
DATED : July 27, 1999
INVENTOR(S) : David D. Barton

It is certified that error appears in the above-indentified patent and that said Letters Patent is hereby corrected as shown below:

On the title page, item [54] Title and Col. 1, line 1;
please delete "PLUS" and insert --PLUG--.

Signed and Sealed this

Twenty-third Day of November, 1999

*Attest:*

Q. TODD DICKINSON

*Attesting Officer*     *Acting Commissioner of Patents and Trademarks*